US008892959B2

(12) United States Patent
Fleming et al.

(10) Patent No.: US 8,892,959 B2
(45) Date of Patent: Nov. 18, 2014

(54) AUTOMATIC PROBLEM DIAGNOSIS

(75) Inventors: Mark S. Fleming, Oro Valley, AZ (US);
Jin Yan Huang, Shanghai (CN); Wei Yin, Shanghai (CN); Yi Zhong, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 13/352,140

(22) Filed: Jan. 17, 2012

(65) Prior Publication Data
US 2013/0185592 A1 Jul. 18, 2013

(51) Int. Cl.
*G06F 11/00* (2006.01)
(52) U.S. Cl.
USPC .......................................... 714/47.1
(58) Field of Classification Search
USPC .......................................... 714/47.1
See application file for complete search history.

(56) References Cited

U.S. PATENT DOCUMENTS

| 7,096,459 | B2 | 8/2006 | Keller et al. | |
|---|---|---|---|---|
| 7,251,584 | B1* | 7/2007 | Perazolo et al. | 702/183 |
| 7,489,639 | B2 | 2/2009 | Breitgand et al. | |
| 7,779,118 | B1 | 8/2010 | Artzi et al. | |
| 7,827,447 | B2* | 11/2010 | Eberbach et al. | 714/45 |
| 7,836,156 | B1 | 11/2010 | Ou et al. | |
| 2003/0020942 | A1* | 1/2003 | Teres | 358/1.14 |
| 2004/0181709 | A1* | 9/2004 | Gibson et al. | 714/25 |
| 2008/0168308 | A1* | 7/2008 | Eberbach et al. | 714/26 |
| 2010/0318846 | A1* | 12/2010 | Sailer et al. | 714/26 |

* cited by examiner

*Primary Examiner* — Bryce Bonzo
(74) *Attorney, Agent, or Firm* — Kunzler Law Group

(57) ABSTRACT

For automatic problem diagnosis, a data collector module collects log data comprising code sets from a plurality of components in a data processing system. An analysis module translates the log data into at least one predefined symptom. Each symptom is associated with at least one code set of the log data. The analysis module selects from a knowledge base at least one problem that includes each symptom. The analysis module further calculates an influence factor for each problem, and ranks each problem from most likely to least likely based on the influence factor of the problem.

18 Claims, 4 Drawing Sheets

AUTOMATIC PROBLEM DIAGNOSIS

BACKGROUND

1. Field

The subject matter disclosed herein relates to problem diagnosis and more particularly relates to automatic problem diagnosis.

2. Description of the Related Art

Many enterprise data processing systems such as storage area networks (SAN) are complex, with many components from multiple vendors. In addition, configurations and components are modified regularly.

BRIEF SUMMARY

An apparatus for automatic problem diagnosis is disclosed. A computer-readable storage medium stores computer-readable program code executable by a processor. The computer-readable program code includes a data collector module that collects log data comprising code sets from a plurality of components in a data processing system. The computer-readable program code further includes an analysis module that translates the log data into at least one predefined symptom. Each symptom is associated with at least one code set of the log data. The analysis module selects from a knowledge base at least one problem that includes each symptom. The analysis module further calculates an influence factor for each problem, and ranks each problem from most likely to least likely based on the influence factor of the problem. A method and computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
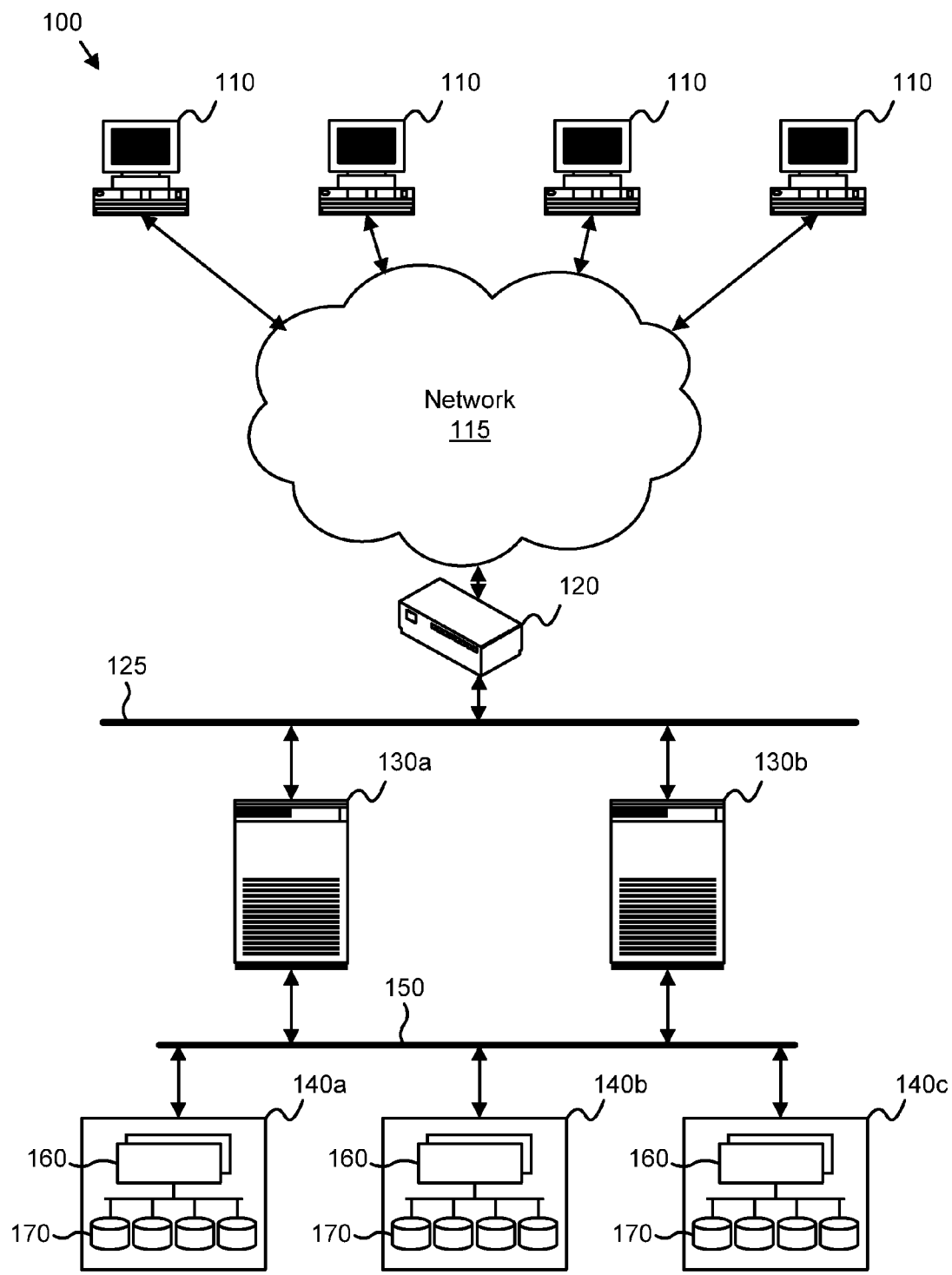
FIG. 1 is a schematic block diagram illustrating one embodiment of a data processing system.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer-readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer-readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer-readable program code may be stored and/or propagated on in one or more computer-readable medium(s).

The computer-readable medium may be a tangible computer-readable storage medium storing the computer-readable program code. The computer-readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer-readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer-readable storage medium may be any tangible medium that can contain, and/or store computer-readable program code for use by and/or in connection with an instruction execution system, apparatus, or device.

The computer-readable medium may also be a computer-readable signal medium. A computer-readable signal medium may include a propagated data signal with computer-readable program code embodied therein, for example, in baseband or as part of a carrier wave. Such a propagated signal may take any of a variety of forms, including, but not limited to, electrical, electro-magnetic, magnetic, optical, or any suitable combination thereof. A computer-readable signal medium may be any computer-readable medium that is not a computer-readable storage medium and that can communicate, propagate, or transport computer-readable program code for use by or in connection with an instruction execution system, apparatus, or device. Computer-readable program code embodied on a computer-readable signal medium may be transmitted using any appropriate medium, including but not limited to wireline, optical fiber, Radio Frequency (RF), or the like, or any suitable combination of the foregoing In one embodiment, the computer-readable medium may comprise a combination of one or more computer-readable storage mediums and one or more computer-readable signal mediums. For example, computer-readable program code may be both propagated as an electro-magnetic signal through a fiber optic cable for execution by a processor and stored on RAM storage device for execution by the processor.

Computer-readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer-readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer-readable program code. The computer-readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer-readable program code may also be stored in a computer-readable medium that can direct a computer, other programmable data processing apparatus, or other devices to function in a particular manner, such that the instructions stored in the computer-readable medium produce an article of manufacture including instructions which implement the function/act specified in the schematic flowchart diagrams and/or schematic block diagrams block or blocks.

The computer-readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer-readable program code.

FIG. 1 is a schematic block diagram illustrating one embodiment of a data processing system (DPS) 100. The DPS 100 includes one or more client computers 110, a network 115, a switch 120, an internal network 125, one or more servers 130, a storage communications channel 150, and one or more storage subsystems 140. In one embodiment, the DPS 100 is configured as a Storage Area Network (SAN). The switch 120, internal network 125, servers 130, storage communications channel 150, and storage subsystems 140 may be referred to as components. One of skill in the art will recognize that the DPS 100 may include many additional types of components.

As used herein, the client computers 110 are referred to as clients 110. The servers 130 may also be configured as mainframe computers, blade centers comprising multiple blade servers, and the like. Although for simplicity four clients 110, one network 115, one switch 120, one internal network 125, two servers 130, one storage communications channel 150, and three storage subsystems 140 are shown, any number of clients 110, networks 115, switches 120, internal networks 125, servers 130, storage communications channels 150 and storage subsystems 140 may be employed. One of skill in the art will also readily recognize that the DPS 100 could include other data processing devices such as bridges, routers, scanners, printers, and the like.

Each storage subsystem 140 includes one or more storage controllers 160 and one or more storage devices 170. The storage controllers 160 may include a Host Bus Adapter (HBA) that communicates with the Host Adapter (HA) of the storage devices 170. The storage devices 170 may be hard disk drives, optical storage devices, magnetic tape drives, micromechanical storage devices, holographic storage devices, and semiconductor storage devices. Alternatively, the storage device 170 may also be configured as a just a bunch of disks (JBOD), a redundant array of independent disks (RAID), a tape library, a tape backup, a tape library, a compact disk read only memory (CD ROM) library, and the like.

In one embodiment, the DPS 100 provides data storage and data manipulation services for the clients 110. For example, a client 110 may access data stored on a storage device 170 of a storage subsystem 140 by communicating a request through the network 115, the switch 120, the internal network 125, a server 130, and the storage communications channel 150 to a storage controller 160 for the storage device 170. The storage controller 160 may retrieve the data from the storage device 170 and communicate the data to the client 110.

The network 115 connecting the clients 110 and the servers 130 may be selected from a local area network (LAN), a wide area network (WAN), the Internet, an Ethernet network, a token ring network, or the like. The network 115 may comprise one or more nodes that may provide one or more physical and/or logical paths for transferring the data. The internal network 125 and the storage communications channel 150 may be for example a LAN, a WAN, or the like.

For convenience, the depicted DPS 100 is simplified. However, a DPS 100 in a typical data center would include numerous components. In addition, the components may be from multiple vendors and include many different models of components from those vendors. As a result, the complexity of the DPS 100 makes it difficult to debug the source of a problem when a problem arises. In the past, subject matter experts for each of the components were needed to analyze those individual components in order to find the root of the problem. When the required subject matter experts were unavailable, debugging analysis typically fell to administrators who often lacked the skill and knowledge to perform a complete analysis. The embodiments described herein automate the scanning and analysis of the DPS 100 as a whole and compare symptoms that are discovered with problems in a knowledge base to more efficiently determine the root problems.

Figure 2:
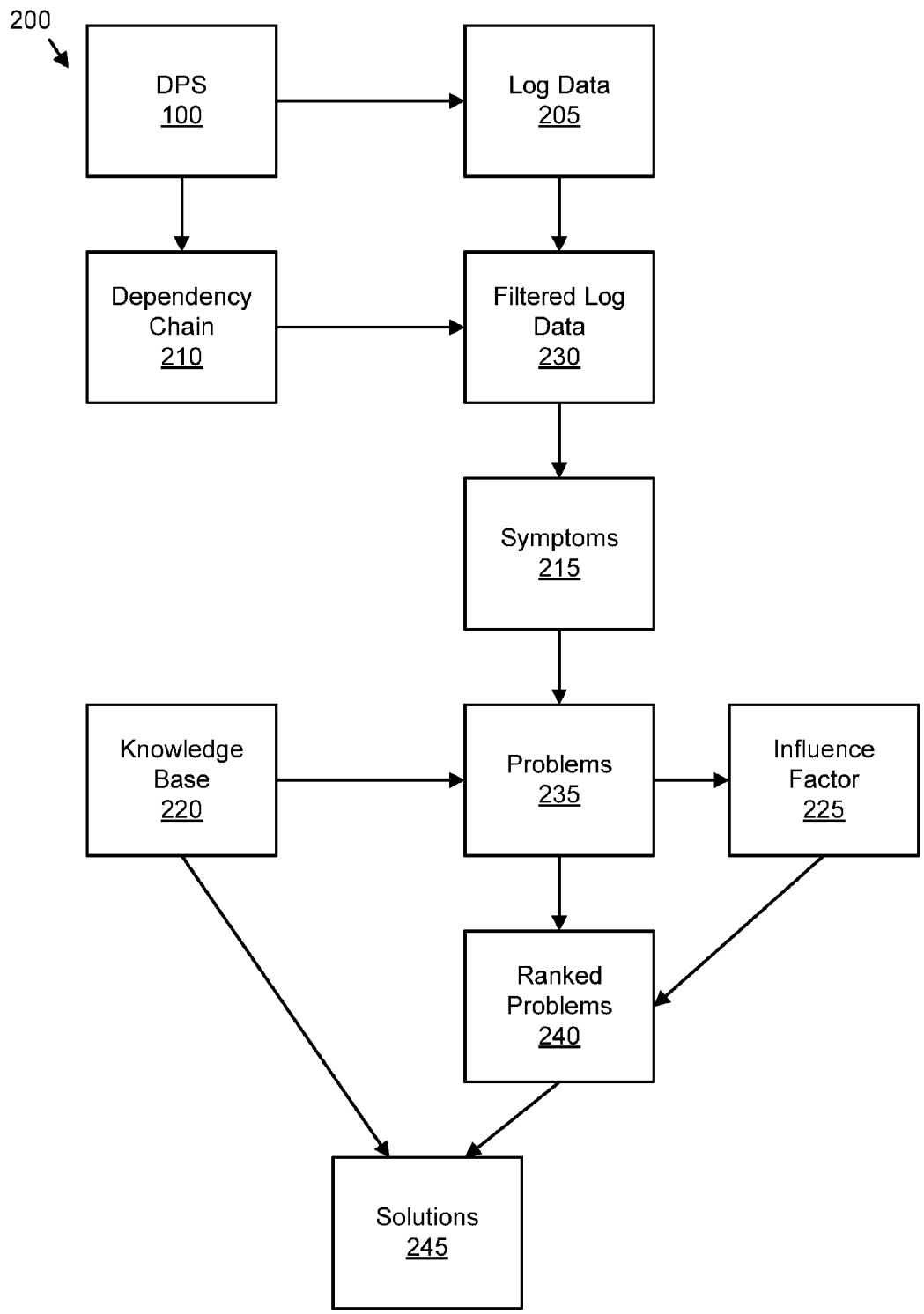
FIG. 2 is a schematic flow chart diagram illustrating data flow for one embodiment of an automatic problem diagnosis method.

FIG. 2 is a schematic flow chart diagram illustrating data flow for one embodiment of an automatic problem diagnosis method 200. The method 200 may automatically diagnose problems of the DPS 100 of FIG. 1. The description of the method 200 refers to elements of FIG. 1, like numbers referring to like elements.

The DPS 100 generates log data 205. The log data 205 may include event notifications, status notifications, log entries, and the like that are referred to hereafter as code sets. Each code set made comprise human-readable data, digital data, or combinations thereof. The codes of each code set comprise error codes, device states, path statuses, and warning codes. In addition, the each code may correspond to at least one of a vendor type, a component type, and a model type. The log data 205 may be stored organized in a temporal sequence in a data file.

The log data 205 may be filtered to generate filtered log data 230. In one embodiment, a dependency chain 210 is calculated for the plurality of components in the DPS 100. The dependency chain 210 may be used to further identify unrelated log data 205 and filter out the unrelated log data 205 to generate the filtered log data 230.

The dependency chain 210 may describe interactions between the components. For example, a first dependency chain 210 may describe a relationship between the server 130, the storage communications channel 150, and the storage subsystem 140. If there is an error for communications between the server 120 and the storage devices 170 of the storage subsystem 140, the first dependency chain 210 may be used to filter out log data 205 from all components that are not included in the first dependency chain 210.

In one embodiment, the log data 205 and/or filtered log data 230 is translated into at least one predefined symptom 215. Each symptom 215 is associated with at least one code set of the log data 205. For example, a first symptom 215 may correspond to a first code set from the switch 120 and a second code set from the server 130. The filtered log data 230 may be translated into the first symptom 215 if the first symptom is associated with a minimum number of code sets from the log data 205 and/or filtered log data 230 as will be described hereafter.

At least one problem 235 that includes each symptom 215 is selected from a knowledge base 220. In one embodiment, the knowledge base 220 includes a table associating each problem with one or more symptoms 215. Each problem 235 that includes each symptom 215 may be selected.

In one embodiment, an influence factor 225 is calculated for the at least one problem 235. The problems 235 may be ranked by influence factor 225 to generate ranked problems 240. A solution 245 may be selected from a knowledge base 220 for each ranked problems 240. In a certain embodiment, the solution 245 is selected for the most likely problem 235 of the ranked problems 240.

Figure 3:
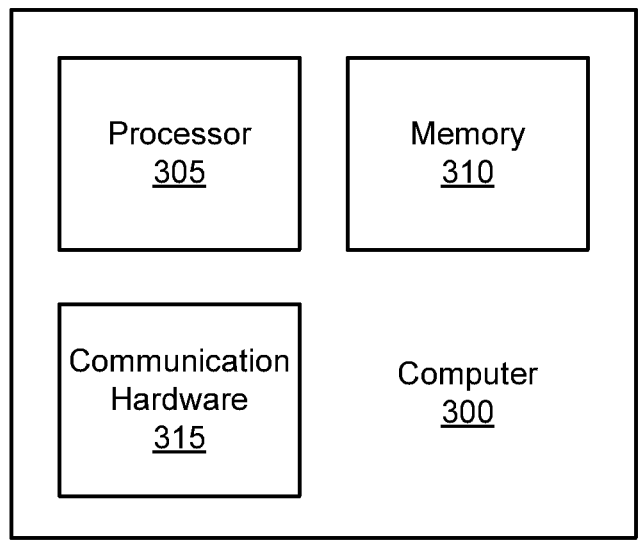
FIG. 3 is a schematic block diagram illustrating one embodiment of a computer.

FIG. 3 is a schematic block diagram illustrating one embodiment of a computer 300. The computer 300 may automatically diagnose problems 235 for the DPS 100. The computer 300 may be the client 110 and/or the server 130 of FIG. 1. The description of the computer 300 refers to elements of FIGS. 1-2, like numbers referring to like elements. The computer 300 includes a processor 305, a memory 310, is in communication hardware 315.

The memory 310 stores computer-readable program code. The memory 310 may be a semiconductor memory, a hard disk drive, an optical storage device, or the like. The processor 305 may execute the computer-readable program code. The communication hardware 315 may communicate with other systems and devices, such as the network 115, and/or the storage subsystems 140.

Figure 4:
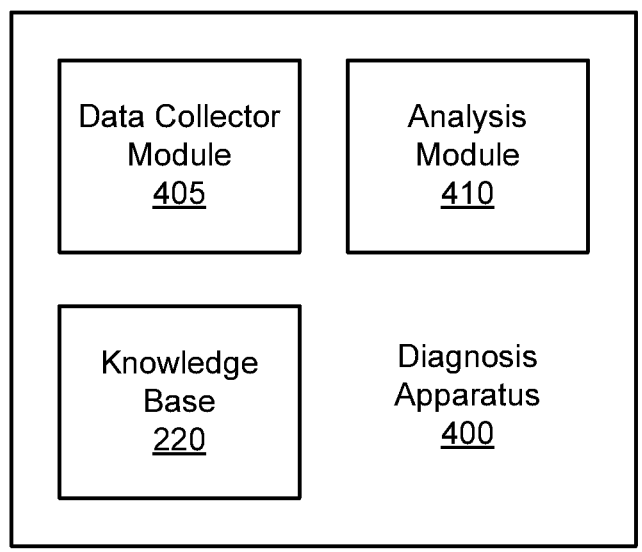
FIG. 4 is a schematic block diagram illustrating one embodiment of a diagnosis apparatus.

FIG. 4 is a schematic block diagram illustrating one embodiment of a diagnosis apparatus 400. The apparatus 400 diagnoses problems 235 for the DPS 100. The apparatus may be embodied in the computer 300 of FIG. 3. The description of the apparatus 400 refers to elements of FIGS. 1-3, like numbers referring to like elements. The apparatus 400 includes a data collector module 405, an analysis module 410, and the knowledge base 220.

In one embodiment, the data collector module 405, the analysis module 410, and the knowledge base 220 are embodied in computer-readable program code stored in a computer-readable storage medium. A computer-readable storage medium may be the memory 310. The computer-readable is program code may be executed by the processor 305 to perform the functions of the data collector module 405, the analysis module 410, and the knowledge base 220.

The knowledge base 220 may store problems 235 corresponding to a plurality of symptoms 215. The knowledge base 220 may be organized as a database with at least one table. The data collector module 405 collects log data 205 from the plurality of components in the DPS 100.

The analysis module 410 translates the log data 205 into at least one predefined symptom 215. Each symptom 215 is associated with at least one code set. The analysis module 410 further selects at least one problem 235 that includes each symptom 215. The analysis module 410 calculates an influence factor 225 for each problem 235. In addition, the analysis module 410 may rank each problem 235 from most likely to least likely based on the influence factor 225 of the problem 235.

Figure 5:
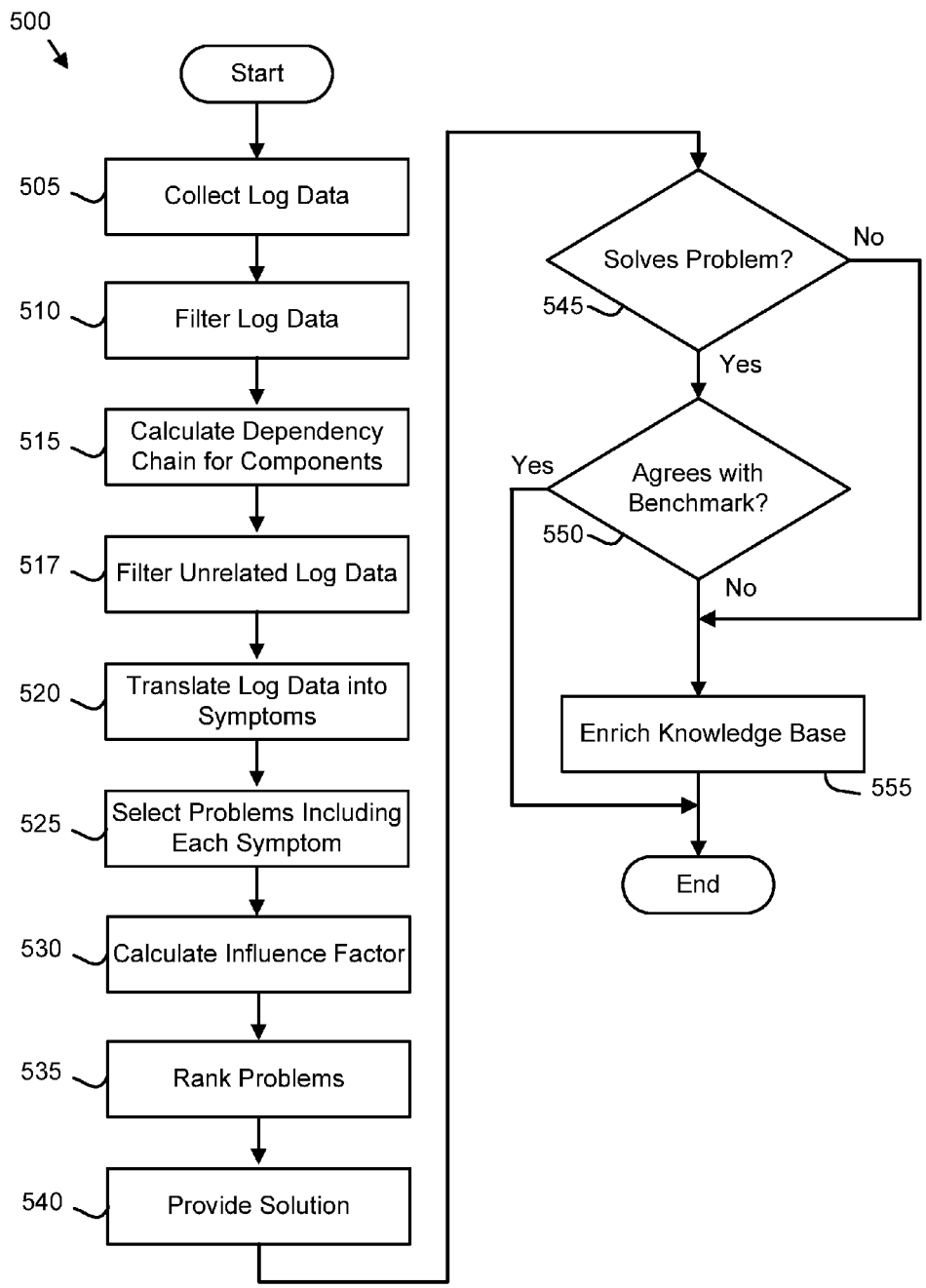
FIG. 5 is a schematic flow chart diagram illustrating one embodiment of an automatic problem diagnosis method.

FIG. 5 is a schematic flow chart diagram illustrating one embodiment of an automatic problem diagnosis method 500. The method 500 may perform the functions of the apparatus 400 of FIG. 4 and the method 200 of FIG. 2. The description of the method 500 refers to elements of FIGS. 1-4, like numbers referring to like elements.

The method 500 may be performed by the processor 305. Alternatively, the method 500 may be performed by a computer-readable storage medium, such as the memory 310, storing computer-readable program code.

The method 500 starts, and in one embodiment, the data collector module 405 collects 505 log data 205 from the plurality of components in the DPS 100. In one embodiment, the data collector module 405 reads one or more log files to collect 505 to log data 205. Alternatively, the data collector module 405 may query the components to request the log data 205.

In one embodiment, the analysis module 410 filters 510 the log data 205 to generate filtered log data 230. In a certain embodiment, the filtered log data 230 comprises log data 205 that exceeds a relevance threshold. In one embodiment, each entry type of the log data 205 is associated with a severity. The relevance threshold may specify a minimum severity for inclusion in the filtered log data 230. Log data 205 associated with a severity that does not exceed the relevance threshold may be filtered out. For example, a routine status message with a severity that is less than the relevance threshold may be filtered out.

The analysis module 410 may further calculate 515 at least one dependency chain 210 for the components. In one embodiment, the analysis module 410 queries each of the components to determine which other components each component communicates with. In one embodiment, each dependency chain 210 lists each component associated with a particular code set of the log data 205. In an alternate embodiment, each dependency chain 210 lists each component associated with a specified component.

In one embodiment, the analysis module 410 filters 517 unrelated log data 205 using the dependency chain 210 to generate the filtered log data 230. The analysis module 410 may remove all code sets for components that are not included in the dependency chain 210 for a component associated with an error, referred to hereafter as the error component. In one embodiment, the filtered log data 230 includes only components listed in at least one dependency chain 210 with the error component.

The analysis module 410 may translate 520 the log data 205 into at least one predefined symptom 215. In a certain embodiment, the analysis module 410 translates 520 the filtered log data 230 into the symptom 215. Each symptom 215 may be associated with at least one code set. In one embodiment, the translated symptoms 215 are associated with a number of code sets found in the filtered log data 230 that is greater than or equal to a symptom threshold.

For example, filtered log data 230 containing the code sets [c1, c2, c4, c5, c6] may be translated in one or more of the symptoms 215 of a prophetic knowledge base 220 listed in Table 1, where symptoms 215 are associated with code sets.

TABLE 1

| Symptom | Code Set |
| --- | --- |
| S1 | c1, c2, c4, c5, c6 |
| S2 | c5, c6, c7 |
| S3 | c8, c9 |

If the symptom threshold is two code sets, then the filtered log data 230 may be translated into symptoms S1 and S2 as S1 is associated with at least two code set [c1, c2, c4], and S2 is associated with at least two code sets [c5, c6] of the log data 205.

Alternatively, the analysis module 410 may score the symptoms 215 as the number of code sets associated with each symptom 215 that are found in the filtered code set 230 divided by the number of code sets associated with the symptom 215. The analysis module 410 may translate 520 the filtered log data 230 into the symptoms 215 that exceed a score threshold.

The analysis module 410 further selects 525 from the knowledge base 220 at least one problem 235 that includes each symptom 215. Continuing the example above, the prophetic knowledge base 220 may include Table 2, where problems 235 are associated with symptoms 215.

TABLE 2

| Problem | Symptoms |
| --- | --- |
| P1 | S1, S2 |
| P2 | S1, S2, S3, S5 |
| P3 | S1, S3, S4 |

Problems 235 P1 and P2 may be selected because P1 and P2 include each symptom S1 and S2. Problem 235 P3 may not be selected because P3 does not include each symptom S1 and S2.

Alternatively, each of the symptoms 215 associated with each problem 235 is weighted. A match score m may be calculated for each problem 235 using Equation 1, where $x_i$ is an ith symptom 215 associated with the problem 235 and $k_i$ is a non-zero weight in a for the ith symptom of the problem 235.

$$m = \Sigma k_i * x_i \quad \text{Equation 1}$$

In one embodiment, the problem 235 with the highest match score may be selected 525. Alternatively, each problem 235 that exceeds a match threshold may be selected 525.

The analysis module 410 may calculate 530 an influence factory 225 for each problem 235. The influence factor 225 for each problem 235 may be calculated as a sum of a normalized impact point ip and a normalized frequency point fp for each problem 235 as shown in Equation 2.

$$y = ip + fp \quad \text{Equation 2}$$

In one embodiment, each impact point for a problem 235 is equal to a number of symptoms 215 associated with the problem 235. Alternatively, each normalized impact point ip may be calculated for each problem 235 using Equation 3, where $n_j$ is a number of symptoms 215 for a jth problem and $n_{max}$ is a greatest number of symptoms for all problems 235.

$$ip_j = n_j / n_{max} \quad \text{Equation 3}$$

In one embodiment, each frequency point $fp_u$ is calculated as a sum of a number of symptoms $n_i$ recorded during a specified ith time interval divided by an age of the specified ith time interval $a_i$ as shown in Equation 3. In one embodiment each time interval is a point in time.

$$fp_u = \Sigma n_i / a_i \quad \text{Equation 4}$$

For example, the symptoms 215 of log data 205 may be divided into four time intervals, a first time interval with an age of 10 seconds, a second time interval with an age of 200 seconds, a third time interval with an age of 2000 seconds, and a fourth time interval with an age of 20,000 seconds. The number of symptoms 215 within each time interval may be divided by the age of the time interval and some to calculate the frequency point for the problem 235. In one embodiment, each time interval is a point in time that a symptom 215 occurs.

The frequency point may be normalized for each problem 235 using Equation 5, where $fp_i$ is the frequency point for the ith problem 235 and $fp_{max}$ is a greatest frequency point among all problems 235.

$$fp_i = fp_{ui}/fp_{max} \quad \text{Equation 5}$$

In one embodiment, the influence factor for each problem 235 associated with a component with no log data 205 is set to a maximum value. Thus if no log data 205 is recorded for the component, the component may be off-line and so be a likely cause of the problem 235. Similarly, the influence factor for each problem associated with a component with clean log data is set to a minimum value. For example, a component of a with no log data 205 may be assumed to have not experienced an error and/or error condition.

The analysis module 410 may rank 535 each problem 235 from most likely to least likely in the ranked problems 240 based on the influence factor 225 of the problem 235. In one embodiment, the problem 235 with the greatest influence factor value is ranked first, the problem 235 with the second greatest influence factor value is ranked second, and so on.

In one embodiment, the analysis module 410 may provide 540 a solution 245 that is associated with each problem 235 in the ranked problems 240. In one embodiment, the knowledge base 220 comprises a table of solutions 245. The table may be indexed by problem 235. A solution 245 may be identified and retrieved using the problem 235 as an index value. In one embodiment, the solution 245 is communicated to an administrator.

The analysis module 410 may determine 545 if the solution 245 solves the problem 235. If the solution 245 does not solve the problem 235, the analysis module 410 may enrich 555 the knowledge base 220 and the method 500 ends. In one embodiment, the analysis module 410 enriches 555 the knowledge base 220 by communicating a request to a subject matter expert to review the problem 235 and the solution 245 and modify the knowledge base 220.

If the solution 245 solves the problem 235, the analysis module 410 may determine 550 if the solution 245 agrees with a benchmark for the problem 235 and solution 245. The benchmark may specify one or more effects of the solution 245. If the solution 245 agrees with the benchmark, the method 500 ends. If the solution 245 does not agree with the benchmark, the analysis module 410 may enrich 555 the knowledge base 220, and the method 500 ends.

The method 500 diagnoses a problem 235 or a rank of ranked problems 240 from log data 205 for a DPS 100. In addition, the method 500 may provide 540 a solution 245 for each diagnosed problem 235. The method 500 may allow administrators that are not subject matter experts for any or all of the components of the DPS 100 to diagnose problems 235 and find solutions 245 to those problems 235. As a result, the cost of diagnosing problems 235 both in terms of DPS 100 downtime and personnel costs is greatly reduced.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a computer-readable storage medium storing computer-readable program code executable by a processor, the computer-readable program code comprising:
   a data collector module collecting log data comprising code sets from a plurality of components in a data processing system; and
   an analysis module translating the log data into at least one predefined symptom wherein each symptom is associated with at least one code set of the log data, selecting from a knowledge base at least one problem that includes each symptom, calculating an influence factor for each problem as a sum of a normalized impact point and a normalized frequency point for each problem, and ranking each problem from most likely to least likely based on the influence factor of the problem.

2. The apparatus of claim 1, wherein the normalized impact point for a first problem is calculated as a number of symptoms corresponding to the first problem divided by a greatest number of symptoms for all problems.

3. The apparatus of claim 1, wherein the frequency point for a first problem is calculated as a sum of a number of symptoms for the first problem recorded during a specified time interval divided by an age of the specified time interval and each normalized frequency point is calculated as the frequency point corresponding to the first problem divided by a greatest frequency point for all problems.

4. A method for automatic problem diagnosis comprising:
   collecting, by use of the processor, log data comprising code sets from a plurality of components in a data processing system;
   translating the log data into at least one predefined symptom wherein each symptom is associated with at least one code set of the log data;
   selecting from a knowledge base at least one problem that includes each symptom;
   calculating an influence factor for each problem as a sum of a normalized impact point and a normalized frequency point for each problem; and
   ranking each problem from most likely to least likely based on the influence factor of the problem.

5. The method of claim 4, wherein the data processing system is a storage area network (SAN).

6. The method of claim 4, wherein the code sets correspond to at least one of a vendor type, a component type, and a model type.

7. The method of claim 4, wherein the normalized impact point for a first problem is calculated as a number of symptoms corresponding to the first problem divided by a greatest number of symptoms for all problems.

8. The method of claim 4, wherein the frequency point for a first problem is calculated as a sum of a number of symptoms for the first problem recorded during a specified time interval divided by an age of the specified time interval and each normalized frequency point is calculated as the frequency point corresponding to the first problem divided by a greatest frequency point for all problems.

9. The method of claim 4, the method further comprising calculating a dependency chain for the plurality of components in the data processing system, and identifying and filtering out unrelated log data based on the dependency chain.

10. The method of claim 4, the method further comprising filtering out log data that does not exceed a relevance threshold.

11. The method of claim 4, the method further comprising providing a solution associated with each problem.

12. The method of claim 4, wherein codes of each code set comprise error codes, device states, path statuses, and warning codes.

13. The method of claim 4, wherein the influence factor for each problem associated with a component with no log data is set to a maximum value and the influence factor for each problem associated with a component with clean log data is set to a minimum value.

14. A computer program product for automatic problem diagnosis, the computer program product comprising:
  a computer-readable storage medium having computer-readable program code embodied therein, the computer-readable program code configured to:
  collect log data comprising code sets from a plurality of components in a data processing system;
  translate the log data into at least one predefined symptom wherein each symptom is associated with at least one code set of the log data;
  select from a knowledge base at least one problem that includes each symptom;
  calculate an influence factor for each problem as a sum of normalized impact point and a normalized frequency point for each problem; and
  rank each problem from most likely to least likely based on the influence factor of the problem.

15. The computer program product of claim 14, the computer-readable program code further configured to calculate a dependency chain for the plurality of components in the data processing system, and identify and filter out log unrelated data based on the dependency chain.

16. The computer program product of claim 14, the computer-readable program code further configured to filter log data from the log data that does not exceed a relevance threshold.

17. The computer program product of claim 14, the computer-readable program code further configured to provide a solution associated with each problem.

18. The computer program product of claim 14, wherein the influence factor for each problem associated with a component with no log data is set to a maximum value and the influence factor for each problem associated with a component with clean log data is set to a minimum value.

* * * * *